Dec. 12, 1967 A. G. PETERSEN 3,357,496

ADJUSTABLE PITCH AXIAL FLOW FAN BLADES

Filed July 28, 1966 2 Sheets-Sheet 1

INVENTOR:
ARNE G. PETERSEN
BY Robert J. Palmer
ATTORNEY

Dec. 12, 1967   A. G. PETERSEN   3,357,496
ADJUSTABLE PITCH AXIAL FLOW FAN BLADES
Filed July 28, 1966   2 Sheets-Sheet 2

INVENTOR:
ARNE G. PETERSEN,
BY Robert J. Palmer
ATTORNEY

United States Patent Office 3,357,496
Patented Dec. 12, 1967

3,357,496
ADJUSTABLE PITCH AXIAL FLOW FAN BLADES
Arne G. Petersen, Norfolk, Mass., assignor to Westinghouse Electric Corporation, Pittsburgh, Pa., a corporation of Pennsylvania
Filed July 28, 1966, Ser. No. 568,504
10 Claims. (Cl. 170—160.6)

ABSTRACT OF THE DISCLOSURE

The root of a blade of an axial flow fan having a radial longitudinal axis is attached to an insert, circular in section, within a corresponding circular opening in the hub of the fan. The insert has a cylindrical extension of reduced diameter concentric with the insert, with its center on the blade axis. There is frictional contact betwen a flat hub surface around the blade axis, and a flat mating surface on and near the inner end of the insert extension, the friction between such surfaces being insufficient to prevent the blade for being rotated by hand about its axis when the blade is at rest, and a blade tightening set screw is loosened. The set screw extends through an opening within the blade root, and is threaded in the insert against a brass disc in contact with a flat intermediate surface of the hub. When the set screw is tightened, it forces the insert outwardly, increasing the friction between the previously mentioned mating surfaces, holding the blade in a selected pitch position. Since the mating surfaces are around the blade axis, centrifugal force increases the friction between them when the blade is rotated.

---

This invention relates to axial flow blowers, and has an an object to improve the methods used for adjusting the pitch of the impeller blades of such blowers.

The usual method of adjusting the pitch of a blade of an axial flow blower consists in loosening the means used to fasten the root of the blade to a hub, rotating the blade about its longitudinal axis to the desired pitch angle, and then retightening the fastening means. The loosening and retightening of such fastening means requires considerable time and effort, especially considering that there may be as many as eight or more blades to adjust. Also, considering the centrifugal forces acting on such fastening means when the blades are rotating during operation of the blower, they may be weakened by frequent adjustment, and the reliability of the blower thereby reduced.

This invention separates the functions of fastening an individual blade to a hub, and the adjusting of the pitch of that blade. In one embodiment of this invention, each blade has a root, circular in section, attached by machine screws to a steel insert within an aluminum hub. The outer portion of the insert is formed as a disc having about the same diameter as the root, and which has a flat outer surface in contact with a flat inner surface of the root. The insert has a cylindrical inner extension coaxial with and having a smaller diameter than the disc, and which has a threaded inner end. A nut is threaded on the latter against a washer in frictional contact with a flat mating surface of the hub, and then is welded to the insert. This nut is not tightened sufficiently to provide sufficient friction between the mating surfaces of the washer and the hub to prevent the blade from being rotated about its longitudinal axis. A set screw extends through a cylindrical opening in the root of the blade, and is threaded into the insert against a brass disc in contact with a flat intermediate surface of the hub, sufficiently to provide sufficient friction between the washer and the mating surface of the hub to lock the insert against rotary movement about the axis of its cylindrical extension. Thereafter, when the blade is rotated during normal operation of the blower, centrifugal force causes sufficient friction between the mating surfaces of the washer and the hub to maintain the blade in position.

In another embodiment of this invention, the nut, the washer, and the threads on the cylindrical extension of the insert are omitted, the latter is shortened, and a disc is formed on its inner end. This disc has a flat outer surface in frictional contact with the surface of the hub which the washer contacts in the previously described embodiment of the invention. This frictional contact between this disc and the mating surface of the hub is insufficient to prevent the blade from being rotated about its longitudinal axis. The previously described set screw, when tightened, provides sufficient friction between this disc and the mating surface of the hub, to lock the insert against rotary movement about the axis of its cylindrical extension. Thereafter, when the blade is rotated during normal operation of the blower, centrifugal force causes sufficient friction between the mating surfaces of this disc and the hub to maintain the blade in position.

In both embodiments of the invention, when the pitch of the blade is to be changed, with the blade at rest, its set screw is loosened to permit the blade to be rotated about its longitudinal axis to the desired pitch angle. Thereafter, the set screw is tightened to maintain the blade at the desired pitch angle. The set screw is a relatively small one requiring small tightening and untightening forces, and is, therefore, easily and quickly adjusted. It is not necessary to touch the screws attaching the blade root to the insert during the adjusting of the pitch of the blade.

Another object of this invention is to separate the functions of attaching a blade to the hub, and the adjusting of the pitch of the blade.

This invention will now be described with reference to the annexed drawings, of which:

Figure 1:
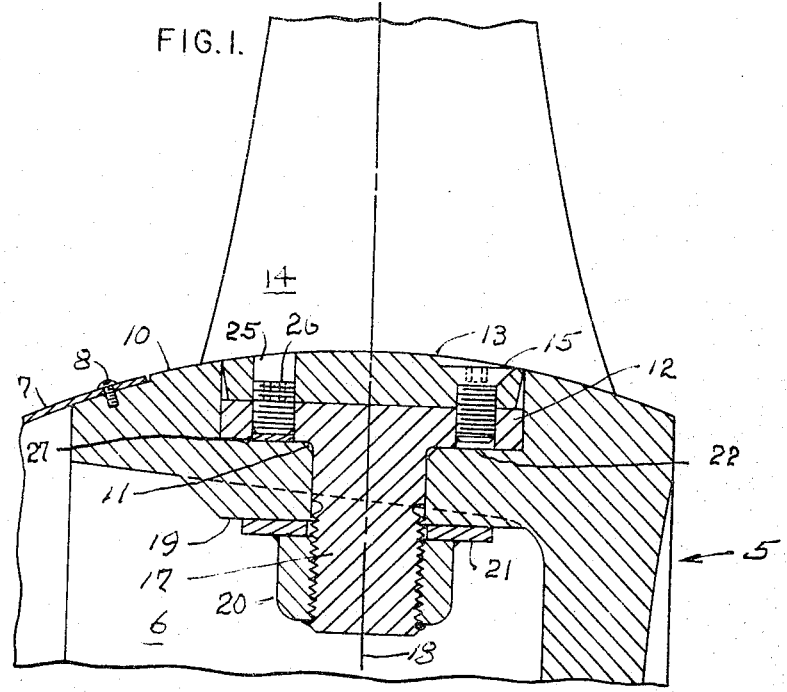
FIG. 1 is a fragmentary side view, partially in section of a blade and hub assembly embodying this invention, the section being along the lines 1—1 of FIG. 2.
Figure 2:
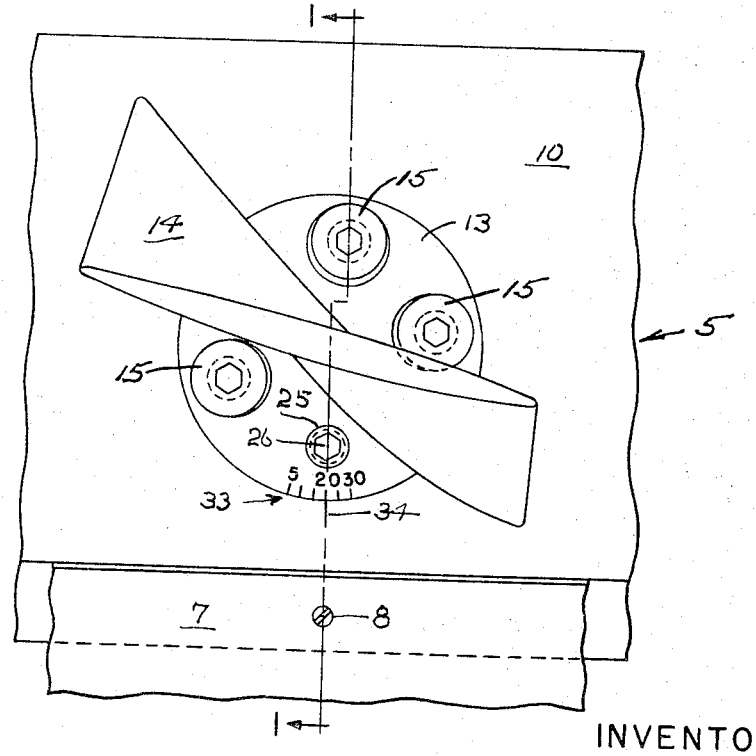
FIG. 2 is a view looking downwardly on the assembly of FIG. 1, with the assembly rotated 90°.

Referring first to FIGS. 1 and 2 of the drawings, a hub 5 of an axial flow blower has a central cavity 6 around the entrance to which extends a nose piece 7. The hub 5 has an outer portion 10 around the cavity 6. The nose piece 7 is attached to the hub portion 10 by screws 8, one of which is shown by FIG. 1. The hub 5 preferably is aluminum. A steel insert 11 has an outer portion formed as a disc 12 with a flat outer surface in contact with a flat inner surface of root 13 of impeller blade 14 which preferably is aluminum. The root 13 is circular in section, and has about the same diameter as the disc 12. The disc 12 has a flat, annular, inner surface in contact with a flat shoulder 22 of the hub portion 10. The hub portion 10 has a circular opening containing and having substantially the same diameter as the root 13 and the disc 12. The root 13 is fixedly attached to the disc 12 by three socket screws 15 which are threaded into the disc 12. The insert 11 has a cylindrical, inner extension 17 of reduced diameter having an axis on the radial, longitudinal axis 18 of the blade 14, which axis passes through the centers of the root 13 and the disc 12. The hub portion 10 has a flat, inner surface 19 around the extension 17, and has a circular opening having substantially the same diameter as that of the extension 17, and through which the latter extends. The inner end portion of the extension 17 extends into the cavity 6, and is threaded. A nut 20 is threaded on the threaded portion of the extension 17 against the inner surface of a washer 21, the outer surface of which is in contact with the hub surface 19. The nut 20 attaches the insert 11 to the hub portion 10. The contacting surfaces of the washer 21 and the hub surface 19 are friction surfaces, the friction between them being insufficient to prevent the blade 14 from being rotated by hand about the axis 18.

The blade root 13 has a circular opening 25 into which extends a socket set screw 26 which is threaded into and through the disc 12 against a brass disc 27 in contact with the hub shoulder 22. The set screw 26, when tightened, applies through the disc 27, pressure against the hub shoulder 22 to force the insert 11 outwardly, providing sufficient friction between the washer 21 and the hub surface 19 to maintain the insert 11, and the blade 14, in a selected position when the blade is at rest. When the blade is rotated in normal operation, centrifugal force causes greatly increased friction between the washer 21 and the hub surface 19, maintaining the blade in its selected position. The brass disc 27 prevents scoring of the hub surface 22 by the set screw 26.

The blade root 13 has a scale 33 on its outer surface near its circular edge, which is calibrated in pitch angles. The hub portion 10 has a line marker 34 on its outer surface opposite the scale 33. FIG. 2 of the drawings shows that the blade 14 has a pitch angle of 20°. When it is desired to change the pitch angle, with the blade at rest, all that it is necessary to do is to loosen the set screw 26; to then rotate the blade 14 by hand about its longitudinal axis to place the desired angle number of the scale 33 opposite the marker 34, and then to retighten the set screw 26.

Figure 3:
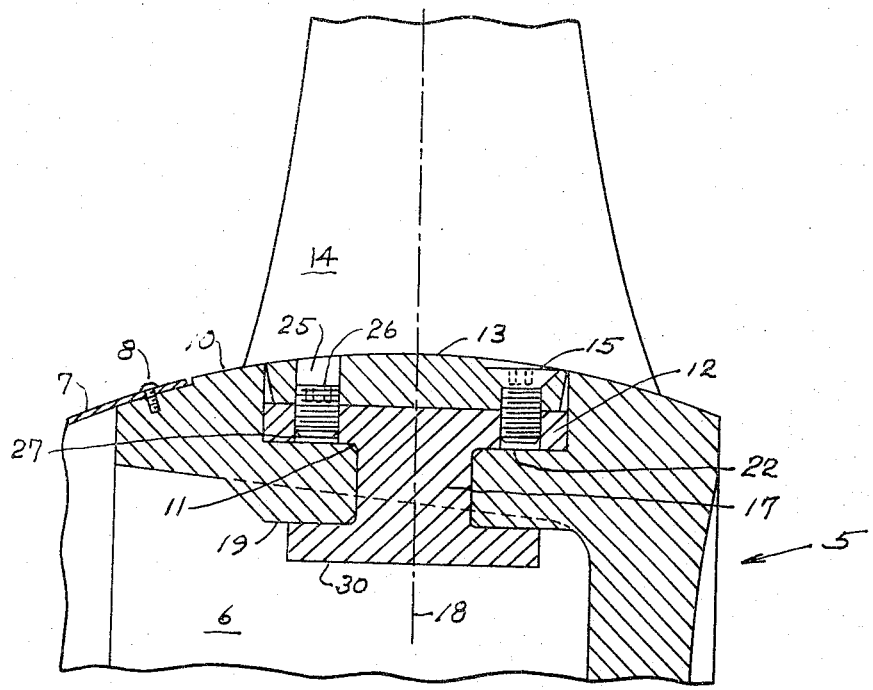
FIG. 3 is a view similar to FIG. 1 but showing another embodiment of this invention.

Referring now to FIG. 3 of the drawings, the construction is the same as that shown by FIG. 1, and described in connection with FIG. 1, except that the cylindrical extension 17 of the insert 11 is shorter; does not have threads on its inner end portion; the nut 20 and the washer 21 are not used, and a disc 30 having a diameter smaller than that of the disc 12 is formed on the inner end of the cylindrical extension 17. The disc 30 has its outer surface in frictional contact with the hub surface 19, the friction between such surfaces being insufficient to prevent the blade 14 from being rotated about its longitudinal axis by hand when the set screw 26 is loosened. When the set screw 26 is tightened, it applies through the disc 27, pressure against the hub shoulder 22 to force the insert 11 outwardly, providing sufficient friction between the outer surface of the disc 30 and the hub surface 19 to maintain the blade 14 in a desired position as in FIG. 1. The pitch angle can be adjusted by loosening the set screw 26, and rotating the blade about its longitudinal axis to the desired pitch angle as described in the foregoing in connection with FIG. 2.

What is claimed is:

1. An axial flow blower comprising an impeller blade having a root through which extends radially the longitudinal axis of said blade, a hub, an insert within an opening within said hub, means fixedly attaching said root to said insert, means including a surface of said hub forming a pair of surfaces in frictional contact around a radial line extending through said axis for attaching said insert to said hub, and means for decreasing the friction between said surfaces for permitting adjustment of the pitch of said blade, and for increasing the friction between said surfaces for holding said blade in a selected pitch position.

2. An axial flow blower comprising an impeller blade having a root circular in section through the center of which extends the longitudinal axis of said blade, a hub having a circular opening containing said root, an insert having a circular outer portion within said opening inwardly of said root, means fixedly attaching said root to said insert portion, said insert having a cylindrical extension coaxial with and having a smaller diameter than said insert portion and extending radially inwardly of the latter, said hub having a circular opening having substantially the same diameter as said extension containing the latter, means including a surface of said hub around said extension and another surface around said extension in frictional contact with said surface for attaching said insert to said hub, and means for decreasing the friction between said surfaces for permitting adjustment of the pitch of said blade, and for increasing the friction between said surfaces for holding said blade in a selected pitch position.

3. An axial flow blower as claimed in claim 2 in which said means for increasing and decreasing said friction comprise aligned openings extending through said root and said outer portion of said insert, a hub surface at the inner surface of said outer portion of said insert, and adjustable means extending through said aligned openings against said hub surface.

4. An axial flow blower comprising a hub having an outer portion around a cavity within said hub, an impeller blade having a radially extending longitudinal axis, and having a root circular in section with its center on said axis, said hub portion having a circular opening having substantially the same diameter as said root around and concentric with said root, an insert having a circular outer portion having substantially the same diameter as said opening within said opening inwardly of said root, means fixedly attaching said root to said outer portion of said insert, said hub portion having another circular opening smaller than said opening extending inwardly therefrom to said cavity, said insert having a cylindrical extension having substantially the same diameter as said other opening and extending radially inwardly through the latter into said cavity, means including an inner surface of said hub portion around said extension at said cavity and another surface around said extension in frictional contact with said surface for attaching said insert to said hub portion, and means for decreasing the friction between said surfaces for permitting adjustment of the pitch of said blade, and for increasing said friction for holding said blade in a selected pitch position.

5. An axial flow blower as claimed in claim 4 in which said means for increasing and decreasing said friction comprises aligned openings extending through said root and said outer portion of said insert, includes a hub surface at the inner surface of said outer portion of said insert, and includes means extending through said aligned openings for providing pressure against said hub surface.

6. An axial flow blower as claimed in claim 5 in which said means extending through said aligned openings is threaded in said outer portion of said insert.

7. An axial flow blower comprising a hub having a cavity therein and having an outer portion around said cavity, an impeller blade having a radially extending longitudinal axis and having a root circular in section with its center on said axis, said hub portion having a circular opening having substantially the same diameter as and extending around said root, an insert having a circular outer portion with substantially the same diameter as and within said opening inwardly of said root, the outer surface of said insert portion being in contact with the inner surface of said root, means fixedly attaching said root to said insert portion, said hub portion having a circular opening smaller than and concentric with said opening and extending from the latter to said cavity, said insert having a cylindrical extension having substantially the same diameter as and extending through said smaller opening into said cavity, the inner portion of said extension being threaded, a washer around said extension in contact with the inner surface of said hub portion at said cavity, a nut threaded on said threaded portion against said washer, said hub portion having another surface in contact with the inner surface of said insert portion around said extension, said root and said insert portion having aligned openings extending therethrough opposite said other hub surface, and means including means extending through said aligned openings and threaded in said insert portion for exerting pressure against said other hub surface for increasing the friction between said washer and said inner hub surface.

8. An axial flow blower as claimed in claim 7 in which said means extending through said aligned openings is a set screw, and in which a disc is provided between the inner end of said set screw and said other hub surface.

9. An axial flow blower comprising a hub having a cavity therein and having an outer portion around said cavity, an impeller blade having a radially extending longitudinal axis and having a root circular in section with its center on said axis, said hub portion having a circular opening having substantially the same diameter as and extending around said root, an insert having a circular outer portion with substantially the same diameter as and within said opening inwardly of said root, the outer surface of said insert portion being in contact with the inner surface of said root, means fixedly attaching said root to said insert portion, said hub portion having a circular opening smaller than and concentric with said opening and extending from the latter to said cavity, said insert having a cylindrical extension having substantially the same diameter as and extending through said smaller opening into said cavity, said insert having a disc-shaped inner portion on the inner end of said extension, said disc-shaped portion having a diameter larger than that of said extension and having its outer surface in contact with the inner surface of said hub portion at said cavity, said last mentioned surface being flat where it contacts said outer surface of said disc-shaped portion, said hub portion having another surface in contact with the inner surface of said first mentioned insert portion around said extension, said root and said first mentioned insert portion having aligned openings extending therethrough opposite said other hub surface, and means including means extending through said aligned openings and threaded into said first mentioned insert portion for exerting pressure against said other hub surface for increasing the friction between said outer surface of said disc-shaped portion and said inner surface of said hub portion.

10. An axial flow blower as claimed in claim 9 in which said means extending through said aligned openings is a set screw, and in which a disc is provided between the inner end of said set screw and said other hub surface.

References Cited

UNITED STATES PATENTS

| | | | |
|---|---|---|---|
| 2,664,961 | 1/1954 | Goede | 230—134.2 |
| 3,231,022 | 1/1966 | Schroeter et al. | 230—120 |

FOREIGN PATENTS

| | | |
|---|---|---|
| 520,194 | 6/1953 | Belgium. |
| 8,880 | 1907 | Great Britain. |
| 367,265 | 2/1932 | Great Britain. |
| 634,486 | 3/1950 | Great Britain. |
| 210,007 | 8/1940 | Switzerland. |

HENRY F. RADUAZO, *Primary Examiner.*